United States Patent
Matsumoto et al.

(10) Patent No.: US 9,815,127 B2
(45) Date of Patent: Nov. 14, 2017

(54) BALL END MILL

(71) Applicant: MITSUBISHI MATERIALS CORPORATION, Tokyo (JP)

(72) Inventors: Genki Matsumoto, Akashi (JP); Takayuki Azegami, Akashi (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 216 days.

(21) Appl. No.: 14/388,176

(22) PCT Filed: Mar. 13, 2013

(86) PCT No.: PCT/JP2013/056904
§ 371 (c)(1),
(2) Date: Sep. 25, 2014

(87) PCT Pub. No.: WO2013/146237
PCT Pub. Date: Oct. 3, 2013

(65) Prior Publication Data
US 2015/0043980 A1 Feb. 12, 2015

(30) Foreign Application Priority Data
Mar. 29, 2012 (JP) .................................. 2012-077247

(51) Int. Cl.
*B23C 5/10* (2006.01)

(52) U.S. Cl.
CPC .... B23C 5/1009 (2013.01); *B23C 2210/0414* (2013.01); *B23C 2210/0442* (2013.01); *Y10T 407/1948* (2015.01)

(58) Field of Classification Search
CPC .......... B23C 5/1009; B23C 2210/0414; B23C 2210/0442; B23C 5/1036; Y10T 407/1964
See application file for complete search history.

(56) References Cited

U.S. PATENT DOCUMENTS

| 5,558,475 | A | | 9/1996 | Hakansson et al. |
| 5,782,589 | A | * | 7/1998 | Cole ..................... B23B 51/048 407/33 |

(Continued)

FOREIGN PATENT DOCUMENTS

| CN | 201157925 Y | | 12/2008 | |
| JP | 04159009 A | * | 6/1992 | ........... B23C 5/1045 |

(Continued)

OTHER PUBLICATIONS

English translation of JP 04159009 A, Jun. 1992.*

(Continued)

*Primary Examiner* — Sunil K Singh
*Assistant Examiner* — Alan Snyder
(74) *Attorney, Agent, or Firm* — Leason Ellis LLP

(57) ABSTRACT

A ball end mill comprises a gash provided at a front end portion of a main end mill body rotated about an axis; and at least one cutting edge which has a rotational trajectory around the axis that forms a convex hemispherical shape having a center on the axis. The cutting edge is formed at a peripheral edge portion of a wall surface of the gash. A difference between a first and second included angles is within ±7°, where the first included angle is formed between the axis and a straight line connecting the center with a cutting edge position at which a depth of the gash is maximal in a cross-section orthogonal to the cutting edge, and the second included angle is formed between the axis and a straight line connecting the center with a cutting edge position at which a rake angle of the cutting edge is maximal.

7 Claims, 2 Drawing Sheets

(56) References Cited

U.S. PATENT DOCUMENTS

| | | | | |
|---|---|---|---|---|
| 6,607,333 B2* | 8/2003 | Satran | ................... | B23C 5/1036 |
| | | | | 407/33 |
| 2003/0198525 A1* | 10/2003 | Iwamoto | ............... | B23C 5/1009 |
| | | | | 407/54 |
| 2006/0093445 A1* | 5/2006 | Tsuchitani | ............ | B23C 5/1036 |
| | | | | 407/54 |
| 2010/0129165 A1* | 5/2010 | Hughes | ................ | B23C 5/1036 |
| | | | | 407/42 |
| 2011/0211922 A1* | 9/2011 | Maeda | ................. | B23C 5/1009 |
| | | | | 407/54 |

FOREIGN PATENT DOCUMENTS

| | | |
|---|---|---|
| JP | 08-141816 A | 6/1996 |
| JP | 10-80815 A | 3/1998 |
| JP | 2000-334614 A | 12/2000 |
| JP | 2004-074329 A | 3/2004 |
| JP | 2005-118960 A | 5/2005 |
| JP | 2010-105092 A | 5/2010 |
| JP | 2011-189463 A | 9/2011 |
| KR | 2011-0119932 A | 11/2011 |
| WO | WO-2011/062901 A | 5/2011 |

OTHER PUBLICATIONS

International Search Report dated May 28, 2013 for the corresponding PCT Application No. PCT/JP2013/056904.
Extended European Search Report dated Nov. 9, 2015 for the corresponding European Application No. 13768812.3.

* cited by examiner

BALL END MILL

CROSS-REFERENCE TO RELATED PATENT APPLICATIONS

This application is a U.S. National Phase application under 35 U.S.C. §371 of International Patent Application No. PCT/JP2013/056904, filed Mar. 13, 2013, and claims the benefit of Japanese Patent Application No. 2012-077247, filed on Mar. 29, 2012, all of which are incorporated by reference in their entirety herein. The International Application was published in Japanese on Oct. 3, 2013 as International Publication No. WO/2013/146237 under PCT Article 21(2).

FIELD OF THE INVENTION

The present invention relates to a ball end mill in which a cutting edge has a rotational track (trajectory) around an axis that forms a convex hemispherical shape having a center on the axis, and is formed at a peripheral edge portion of a wall surface of the gash, which is formed at a front end portion of a main end mill body rotated about the axis, facing an end mill rotation direction.

BACKGROUND OF THE INVENTION

As this type of ball end mill, for example, Japanese Patent No. 3957230 proposes a ball end mill in which a rake angle in a cross-section from the center of the cutting edge in a radial direction is a negative angle at a portion closer to an outer peripheral cutting edge than a position where the cutting edge (radial cutting edge) protrudes farthest forward in a rotation direction from a segment connecting an outer peripheral cutting edge with an axis of a tool, and the rake angle is in the range of 0° to +10° at a portion close to the axis of the tool from the position in a view showing an end face of the tool.

Japanese Patent No. 3957230 discloses as follows: In this ball end mill, a portion where the cutting edge protrudes most from the segment is generally close to a portion where the depth of a groove of the outer peripheral cutting edge is largest and chips are easily removed. Accordingly, it is possible to increase the strength of the cutting edge by setting a rake angle to a negative angle on the outer peripheral side of this portion. Since the strength of the cutting edge needs to be maintained on the side (tool axis side) that is closer to a front end than the portion where the cutting edge protrudes most, the depth of the groove is made small. Accordingly, it is possible to secure the groove by setting the rake angle of the cutting edge to a range of 0° to +10°, which is larger than a negative angle, and to reduce the wear of a tool, which is caused by the generation of an unnecessary force or heat, by making the removal of chips convenient.

TECHNICAL PROBLEM

Incidentally, on the cutting edge of the ball end mill, gashes (concave grooves) are formed from the rear end-outer peripheral side of the front end portion of the main end mill body toward the front end-inner peripheral side, a wall surface of the gash facing the end mill rotation direction is used as a rake face, and a rotational track (trajectory) is formed at an intersection ridge portion between the wall surface and a front end flank of the main end mill body, that is, the peripheral edge portion of the wall surface used as the rake face so as to form a convex hemispherical shape, which has the center as a center.

Further, the depth of the gash toward the center from the cutting edge is generally reduced after being increased once as the cutting edge goes toward the rear end-outer peripheral side from the front end-inner peripheral side, and the gash is connected to a chip discharge groove of the outer peripheral cutting edge. Accordingly, since a distance between the bottom of the gash and the cutting edge is long at the position where the depth of the gash is maximal, moment, which acts on the main end mill body over the front end flank from the wall surface used as the rake face due to cutting resistance, is also large.

However, in the ball end mill disclosed in Japanese Patent No. 3957230, the position where the depth of the gash is maximal is closer to the rear end-outer peripheral side than the position where the cutting edge protrudes most in the end mill rotation direction in the view showing the end face. Accordingly, since cutting resistance is increased due to the reduction of the sharpness of the cutting edge when the rake angle of the cutting edge is a negative angle at the position where the depth of the gash is maximal, the moment, which acts on the main end mill body, is also increased. For this reason, there is a concern that damage to a portion between the wall surface and the front end flank may occur.

Furthermore, if the rake angle is a negative angle at a portion that is closer to the outer peripheral cutting edge than the position where the cutting edge protrudes most in the end mill rotation direction as described above, cutting resistance is also increased when this portion is used for cutting. Accordingly, the deflection of the main end mill body occurs and causes machining accuracy to be poor or tearing occurs on the machined surface. For this reason, there is also a concern that quality in machining may decrease.

The invention has been made in consideration of the background, and a first object of the invention is to provide a ball end mill that does not interfere with the defect resistance of a cutting edge of which a rotational track forms a convex hemispherical shape, and a second object of the invention is to provide a ball end mill that can ensure sharpness on a rear end-outer peripheral side of a main end mill body.

SUMMARY OF THE INVENTION

Technical Solution

To solve the above-mentioned problems and to achieve the first object, according to an aspect of the invention, there is provided a ball end mill in which a gash is formed at a front end portion of a main end mill body rotated about an axis and a cutting edge has a rotational track (trajectory) around the axis that forms a convex hemispherical shape having a center on the axis. The cutting edge is formed at a peripheral edge portion of a wall surface of the gash facing an end mill rotation direction. A difference between a first and second included angles is within ±7°, where the first included angle is formed between the axis and a straight line connecting the center on the axis with a cutting edge position at which a depth of the gash is maximal in a cross-section orthogonal to the cutting edge, and the second included angle is formed between the axis and a straight line connecting the center on the axis with a cutting edge position at which a rake angle of the cutting edge is maximal on a positive angle side in the cross-section.

In the ball end mill having this structure, the rake angle in the cross-section orthogonal to the cutting edge is maximal on the positive angle side in a range around an end where a difference in the included angle is within ±7° at the position which is present on the cutting edge and at which the depth of the gash is maximal. Accordingly, the sharpness of the cutting edge at this position is made highest so that cutting resistance acting on the cutting edge during cutting is reduced. Therefore, it is also possible to reduce the moment that acts on a portion between the wall surface of the gash, which is used as the rake face of the main end mill body, and the front end flank. For this reason, even when a portion where the depth of the gash is maximal is used for cutting, it is possible to prevent the occurrence of damage to the main end mill body. As a result, it is possible to lengthen the tool life.

Of course, when the rake angle of the cutting edge is maximal on the positive angle side at the position which is present on the cutting edge and at which the depth of the gash is maximal, it is possible to prevent damage to the main end mill body at the position where the depth of the gash is maximal, by more reliably reducing cutting resistance and moment. Further, the rake angle of the cutting edge is increased on a negative angle side from this position toward the front end-inner peripheral side and the rear end-outer peripheral side of the main end mill body. However, when the rake angle of the cutting edge is set to 0° on the front end side and the outer peripheral side of the cutting edge to achieve the second object, it is possible to ensure sharpness by making the rake angle be 0° or more and not be a negative angle on the entire cutting edge, and to perform cutting with high accuracy and high quality by preventing the deflection of the main end mill body and the tearing of the machined surface even when the rear end-outer peripheral side of the cutting edge is used.

Advantageous Effects

As described above, according to the invention, it is possible to make sharpness high during cutting by making the rake angle of the cutting edge maximal on the positive angle side around a position where the depth of a gash is maximal. Accordingly, it is possible to reduce cutting resistance and moment and to prevent damage to the cutting edge. Further, if the rake angle of the cutting edge is set to 0° on the front end-inner peripheral side and the rear end-outer peripheral side of the cutting edge of the front end portion of the main end mill body, it is possible to make sharpness high and to prevent the deflection of the main end mill body and the tearing of the machined surface even when the rear end-outer peripheral side of the cutting edge is used. Accordingly, it is possible to perform cutting with high accuracy and high quality.

BRIEF DESCRIPTION OF THE DRAWINGS

These and other features and advantages of the present invention will become more readily appreciated when considered in connection with the following detailed description and appended drawings, wherein like designations denote like elements in the various views, and wherein.

EXPLANATION OF REFERENCE

Figure 1:
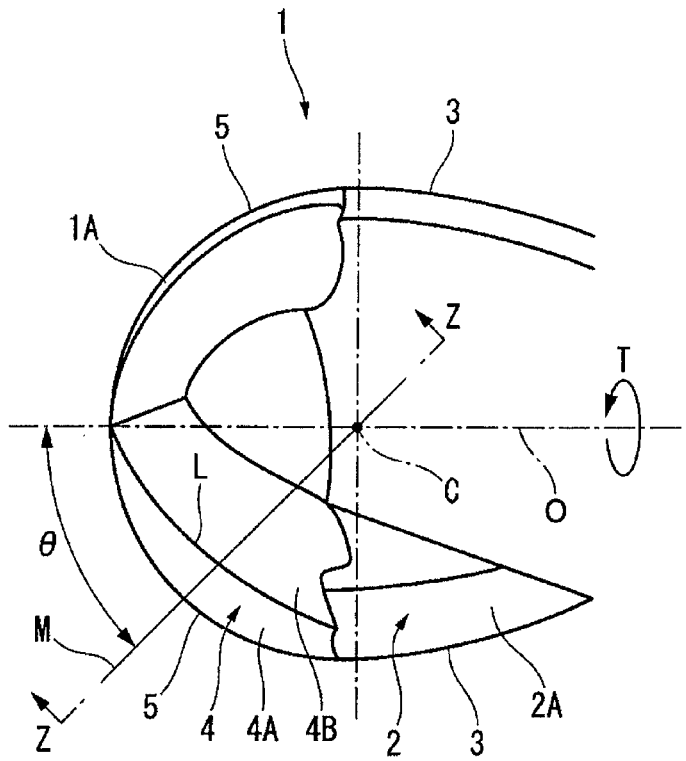
FIG. 1 is a side view of a main end mill body showing an embodiment of the invention.

1: main end mill body
2: chip discharge groove
3: outer peripheral cutting edge
4: gash
4A: wall surface of gash 4 facing end mill rotation direction T
4B: wall surface of gash 4 facing rear side in end mill rotation direction T
5: cutting edge (radial cutting edge)
O: axis of main end mill body 1
T: end mill rotation direction
C: center of convex hemispherical shape that is formed by cutting edge 5 on rotational track around axis O
L: intersection ridge between wall surfaces 4A and 4B of gash 4
M: straight line connecting each position, which is present on cutting edge 5, with center C
D: depth of gash 4
α: rake angle of cutting edge 5
θ: included angle formed between straight line M and axis O

DETAILED DESCRIPTION OF THE INVENTION

Best Mode for Carrying Out the Invention

Figure 2:
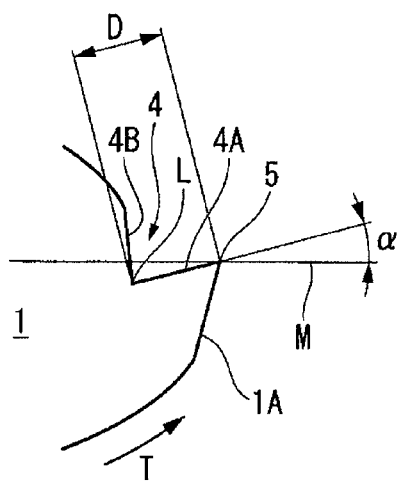
FIG. 2 is a cross-sectional view taken along line Z-Z of FIG. 1.
Figure 3:
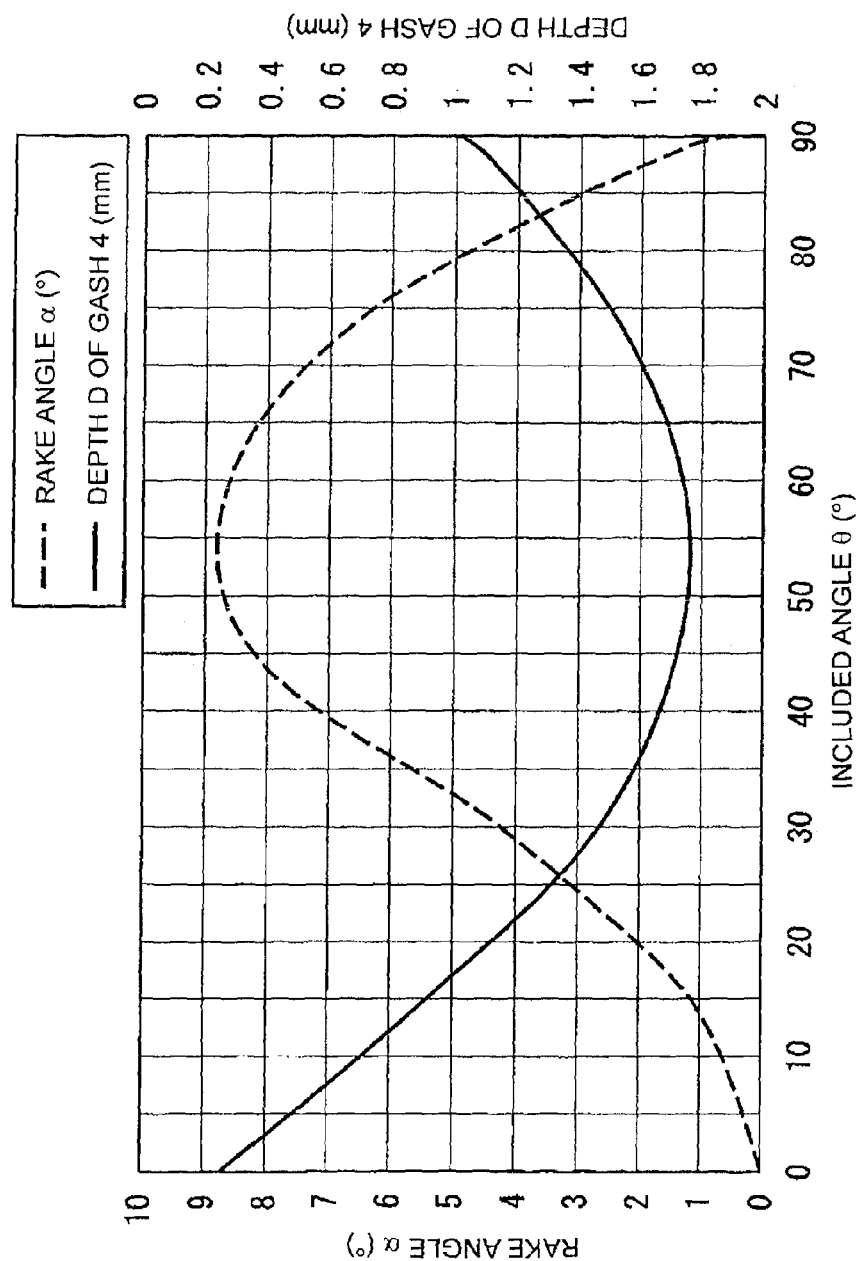
FIG. 3 is a view showing a relationship between the rake angle of a cutting edge (radial cutting edge) of the embodiment shown in FIG. 1 and the depth of a gash.

FIGS. 1 to 3 are views showing an embodiment of the invention. In this embodiment, a main end mill body 1 is made of a hard material, such as cemented carbide, so as to have the shape of a substantially columnar shaft having a center on an axis O, the rear end side (not shown) (left portion in FIG. 1) of the main end mill body 1 forms a columnar shank portion, and the front end portion thereof shown in FIG. 1 forms a cutting edge portion. While the shank portion is held on a spindle of a machine tool and the main end mill body 1 is rotated about the axis O in an end mill rotation direction T shown in FIG. 2, the main end mill body 1 performs cutting by the cutting edge portion as being fed in a direction intersecting with the axis O.

A plurality of (two in this embodiment) chip discharge grooves 2 are formed toward a front end on the outer periphery of the rear end portion of the cutting edge portion at intervals in a circumferential direction, and outer peripheral cutting edges 3, which include the wall surfaces 2A as rake faces, are formed at outer peripheral edge portions of wall surfaces 2A of the chip discharge grooves 2 that face the end mill rotation direction T. Here, the chip discharge grooves 2 and the outer peripheral cutting edges 3 are formed in the shape of a spiral that extends around the axis O so as to face the rear side in the end mill rotation direction T toward the rear end side of the main end mill body 1. Rotational tracks, which are formed around the axis O by the plurality of outer peripheral cutting edges 3, form one cylindrical surface that has a center on the axis O.

Further, the wall surfaces 2A of the chip discharge grooves 2, which face the end mill rotation direction T, and the wall surfaces thereof, which face the rear side in the end mill rotation direction T, are further notched at portions of the chip discharge grooves 2 corresponding to the front end side of the cutting edge portion. As a result, concave groove-shaped gashes 4 are formed. The gash 4 is convexly curved and extends so as to face an inner peripheral side toward the front end side of the main end mill body 1 from the front end portion of the chip discharge groove 2. Likewise, a cutting edge (radial cutting edge) 5, which includes a wall surface 4A as a rake face, is connected to the front end of the outer peripheral cutting edge 3, and has substantially the shape of a quarter of a circular arc, is formed at an intersection ridge portion between a front end flank 1A of the cutting edge portion that is convexly curved and extends so as to face the inner peripheral side toward the front end side of the main end mill body 1 and the wall surface 4A of the gash 4 that faces the end mill rotation direction T, that is, a peripheral edge portion of the wall surface 4A.

The cutting edges 5, which are formed at the peripheral edge portions of the wall surfaces 4A of the respective gashes 4, include a center C on the axis O of the rotational track that is formed around the axis O, and form one convex hemispherical surface that has the same radius as the radius of a cylindrical surface formed by the rotational track of the outer peripheral cutting edge 3. Accordingly, an inner peripheral end of the cutting edge 5 is positioned on the axis of the front end of the cutting edge portion in this embodiment. However, the inner peripheral ends of some cutting edges 5 of the plurality of cutting edges 5 may be short cutting edges that do not reach the axis O.

Further, each gash 4 of this embodiment is formed so that the wall surface 4A, which faces the end mill rotation direction T, and a wall surface 4B, which faces the rear side in the end mill rotation direction T, intersect with each other at an intersection ridge L at an angle as shown in FIG. 2, and the width of the wall surface 4A between the cutting edge 5 and the intersection ridge L in a cross-section, which is orthogonal to the cutting edge 5, is the depth D of the gash 4 at each position on the cutting edge 5.

Meanwhile, if the gash 4 includes the wall surface 4A facing the end mill rotation direction T, the wall surface 4B facing the rear side in the end mill rotation direction T, and a bottom surface intersecting with these wall surfaces 4A and 4B at angles as described above, the depth D of the gash 4 may be the width of the wall surface 4A between the cutting edge 5 and the bottom surface. Furthermore, if the bottom surface has the shape of a concave surface that comes into contact with the wall surfaces 4A and 4B in the cross-section, the depth D of the gash 4 may be the width of the wall surface 4A between the wall surface 4A and a tangent of the bottom surface.

Here, when an included angle formed between a straight line M, which connects each position present on the cutting edge 5 with the center C, and the axis O is denoted by $\theta$ as shown in FIG. 1, in this embodiment, the depth D of the gash 4 is reduced after being gradually increased with the increase of the included angle $\theta$ as shown in FIG. 3, that is, toward the front end of the outer peripheral cutting edge 3, which is present on the rear end-outer peripheral side, along the cutting edge 5 from the position present on the axis O on the front end-inner peripheral side of the main end mill body 1. Meanwhile, the depth D of the gash 4 shown in FIG. 3 is obtained in a case where the outer diameter of the cutting edge (a diameter of the convex hemispherical shape formed by the rotational track of the cutting edge 5) is 6 mm. Further, the included angle $\theta$ at a position where the depth D of the gash 4 is maximal is generally in the range of 45° to 65°.

Further, a rake angle $\alpha$ of the cutting edge 5 in the cross-section, which is orthogonal to the cutting edge 5, is set so as to be maximal on a positive angle side in a range where a difference in the included angle $\theta$ is within ±7° at the position which is present on the cutting edge 5 and at which the depth D of the gash 4 is maximal. Particularly, in this embodiment, the rake angle $\alpha$ of the cutting edge 5 is also set to be maximal on the positive angle side at a position where a difference in the included angle $\theta$ is 0°, that is, the depth D of the gash 4 is maximal.

Here, in this embodiment, the rake angle $\alpha$ is 0° both on the front end-inner peripheral side, which is present on the axis O, of the cutting edge 5 where the included angle $\theta$ is 0° and on the rear end-outer peripheral side that is connected to the outer peripheral cutting edge 3 where the included angle $\theta$ is 90°. Accordingly, the rake angle $\alpha$ of the cutting edge 5 is reduced after being gradually increased on the positive angle side toward the front end of the outer peripheral cutting edge 3, which is present on the rear end-outer peripheral side, along the cutting edge 5 from the position that is present on the axis O on the front end-inner peripheral side of the main end mill body 1, according to the change of the depth D of the gash 4. The rake angle $\alpha$ is a positive angle at a portion except for the front end-inner peripheral side and the rear end-outer peripheral side where the rake angle $\alpha$ is 0°, and is not a negative angle over the total length of the cutting edge 5.

In the ball end mill having this structure, the rake angle $\alpha$ of the cutting edge 5 is also set so as to be maximal in a range around an end where a difference in the included angle $\theta$ is within ±7° at the position which is present on the cutting edge 5 and at which the depth D of the gash 4 is maximal as described above. Accordingly, it is possible to make sharpness highest at the position which is present on the cutting edge 5 and at which the depth D of the gash 4 is maximal. Therefore, it is possible to reduce cutting resistance that acts on the cutting edge 5 at this position during cutting, and also to reduce moment that acts on the main end mill body 1 over the front end flank 1A from the wall surface 4A of the gash 4 that serves as the rake face of the cutting edge 5.

For this reason, when the position which is present on the cutting edge 5 and at which the depth D of the gash 4 is maximal is used for cutting, it is possible to prevent the occurrence of damage to the cutting edge 5 that is caused when the main end mill body 1 is damaged over the front end flank 1A from the wall surface 4A by the moment. Accordingly, it is possible to provide a ball end mill having a long tool life. Meanwhile, at other portions of the cutting edge 5, the rake angle $\alpha$ is smaller than the maximum rake angle but the depth D of the gash 4 is also reduced. Accordingly, the strength of the cutting edge is high, and the occurrence of damage can also be prevented.

In particular, since the position where the depth D of the gash 4 is maximal corresponds to the position where the rake angle $\alpha$ of the cutting edge 5 is maximal in this embodiment, it is possible to more reliably prevent damage to the cutting edge 5. Meanwhile, when a difference in the included angle $\theta$ exceeds ±7°, the position which is present on the cutting edge 5 and at which the rake angle $\alpha$ is maximal is excessively distant from the position which is present on the cutting edge 5 and at which the depth D of the gash 4 is maximal. For this reason, there is a concern that the sharpness of the cutting edge 5 may not be made high at a position where strength or stiffness against the moment is not sufficient and the depth D of the gash 4 is maximal.

Further, in this embodiment, the rake angle $\alpha$ is 0° on the front end-inner peripheral side of the cutting edge 5 and the rear end-outer peripheral side thereof and the rake angle $\alpha$ is set to be maximal on the positive angle side between the front end-inner peripheral side and the rear end-outer peripheral side, that is, the rake angle α is not a negative angle, as described above. Accordingly, even when a portion of the cutting edge 5 between the position where the rake angle α is maximal and the rear end-outer peripheral side is used for cutting, sharpness is not extremely reduced. For this reason, it is possible to prevent the main end mill body 1 from being bent and deflection due to the excessive increase of cutting resistance when this portion is used for cutting, or to prevent the deterioration of the roughness of a machined surface that is caused by the tearing of a machined surface. Therefore, it is possible to perform cutting with high accuracy and high quality.

In this embodiment, the rake angle α is 0° both on the front end-inner peripheral side of the cutting edge 5 and on the rear end-outer peripheral side thereof as described above. However, since the cutting speed caused by the rotation of the main end mill body 1 is 0, for example, at the position that is present on the axis O on the front end-inner peripheral side of the cutting edge 5, a high cutting load acts on the cutting edge 5. Accordingly, the rake angle α may be a negative angle. Furthermore, the rake angle α of the cutting edge 5 and the depth D of the gash 4 may not be reduced after being gradually increased toward the rear end-outer peripheral side from the front end-inner peripheral side, and may be constant at a portion between the rear end-outer peripheral side and the front end-inner peripheral side.

EXAMPLES

The effects of the invention will be described below using examples of the invention. In these examples, three kinds of ball end mills, in which a difference between the included angle θ at the position where the depth D of the gash 4 is maximal and the included angle θ at the position where the rake angle α is maximal is within ±7°, were manufactured on the basis of the embodiment. These ball end mills were referred to as Examples 1 to 3, and included angles θ of the ball end mills were shown in Table 1. Further, a ball end mill in which a difference in the included angle θ is larger than +7° and a ball end mill in which a difference in the included angle θ is smaller than −7° were manufactured for comparison. These ball end mills were referred to as Comparative Examples 1 and 2, and included angles θ of the ball end mills were shown in Table 1 likewise.

TABLE 1

|  | Comparative Example 1 | Example 1 | Example 2 | Example 3 | Comparative Example 2 |
|---|---|---|---|---|---|
| An included angle θ at a position where the depth D of a gash is maximal | 54° | 54° | 54° | 54° | 55° |
| An included angle θ at a position where a rake angle α of a cutting edge is maximal | 40° | 47° | 54° | 61° | 68° |

Meanwhile, Example 2 is the ball end mill of the embodiment of which a relationship between the rake angle α and the depth D of the gash 4 is shown in FIG. 3, and the other Examples 1 and 3 and Comparative Examples 1 and 2 are ball end mills of which a curve showing the change of the rake angle α shown in FIG. 3 and a curve showing the change of the depth D of the gash 4 are not substantially changed and the maximum included angles θ correspond to the positions of the angles shown in Table 1. Furthermore, the outer diameter of the cutting edge 5 of each of Examples and Comparative Examples is 6 mm as in the embodiment.

Further, tool service lives were determined by cutting tests that were performed by these ball end mills. Meanwhile, cutting conditions at this time were as follows: a material to be cut was SKD61 (hardness 50HRC), the speed of rotation of the main end mill body was 7000 min-1, a feed speed was 2500 mm/min, feed per cutting edge was 0.18 mm/tooth, and a cut in a direction orthogonal to the cutting edge (a normal direction) was 1.0 mm. Cutting was performed on a machined surface, which is inclined by an angle of 45°, at a pick feed of 2.5 mm while the axis O of the main end mill body was parallel to a vertical direction and a pick feed direction was directed to the upper side of the inclined surface. Time having passed until the wear width of a flank was 0.1 mm was obtained as a tool life, and a cutting length until that time was measured.

As a result, when a cutting length obtained before the wear of a flank reaches 0.1 mm was 300 m in the ball end mill of Comparative Example 1 of which a difference in the included angle θ is 14° larger than +7° and a cutting length obtained before the wear of a flank reaches 0.1 mm was also 200 mm in the ball end mill of Comparative Example 2 of which a difference in the included angle θ is −13° smaller than −7°, damage to the cutting edge occurred and the ball end mills reached the end of the tool life. In contrast, in the ball end mills of Examples 1 to 3, damage to the cutting edge 5 did not occur until the wear of a flank reached 0.1 mm. When a cutting length was 650 mm in Example 1, a cutting length was 700 mm in Example 2, and a cutting length was 670 mm in Example 3, the wear of a flank of each of the ball end mills reached 0.1 mm and the ball end mills reached the end of the tool life.

The invention claimed is:
1. A ball end mill comprising:
a main end mill body rotatable about an axis;
at least one gash provided at a front end portion of the main end mill body; and
at least one cutting edge which has a rotational trajectory around the axis that forms a convex hemispherical shape having a center on the axis, said cutting edge being provided at a peripheral edge portion of a wall surface of the gash facing an end mill rotation direction,
wherein a difference between first and second included angles is within ±7°, where the first included angle is formed between the axis and a first straight line connecting the center on the axis with a first position on the cutting edge at which a depth of the gash is maximal in a cross-section orthogonal to the cutting edge, and the second included angle is formed between the axis and a second straight line connecting the center on the axis with a second position on the cutting edge at which a rake angle of the cutting edge is maximal on a positive angle side in the cross-section,
the rake angle is not a negative angle along the entire cutting edge, and
the rake angle is increased on the positive angle side from a front end of the cutting edge toward the second position, and the rake angle is reduced from the second position toward a rear end of the cutting edge.

2. The ball end mill according to claim 1,
wherein the rake angle of the cutting edge is 0° on the front end and the rear end of the cutting edge.

3. The ball end mill according to claim 1,
wherein the rake angle of the cutting edge is maximal on the positive angle side at the first position.

4. The ball end mill according to claim 3,
wherein the rake angle of the cutting edge is 0° on the front end and the rear end of the cutting edge.

5. The ball end mill according to claim 1,
wherein the depth of the gash gradually increases and then decreases, from a position on the axis on the front end of the main end mill body, toward a front end of the outer peripheral cutting edge, along the cutting edge.

6. The ball end mill according to claim 1,
wherein the included angle at the first position is in the range of 45° to 65°.

7. The ball end mill according to claim 1, wherein the gash and the cutting edge are directly formed on the main end mill body.

\* \* \* \* \*